United States Patent Office 3,249,449
Patented May 3, 1966

3,249,449
GLASS AND SLAG RESISTANT REFRACTORIES AND PROCESS OF MAKING SAME
Jean-Pierre Kiehl, Lyon, and Joel Nicolle, Paris, France, assignors to Societe Generale des Produits Refractaires, Paris, France, a corporation of France
No Drawing. Filed June 8, 1965, Ser. No. 462,390
7 Claims. (Cl. 106—57)

This application is a continuation-in-part of our application Serial No. 266,218 filed March 19, 1963, now abandoned, and relating to Glass and Slag Resistant Refractories and Process of Making Same.

Crystalline alumina or corundum, and crystalline zirconia are chemical compositions very inert to the contact of numerous industrial corrosive materials in the molten state such as: glasses, metallurgical industrial slags, etc. These materials appear particularly adapted to constitute refractories resistant to these agents.

The chemical inertness of these refractories can still be considerably improved when the brick or shapes are of substantially zero porosity and permeability.

The only usual refractories of this type which are endowed with these properties are obtained by casting into molds a molten composition from an electric furnace. These products have an apparent porosity and a permeability of substantially zero, but they also have certain defects.

The first is the fact that crystallization of heterogeneous products causes the formation of internal cavities; this fault is inherent in the cooling of many molten masses. Attempts have been made to reduce the extent and size of the internal cavities in such castings by pouring additional molten material into the mold during the cooling period, but these measures have not eliminated the cavities.

A second fault is that since these products are melted in a carbon electrode furnace, they tend to contain some traces of reduced oxides or metals, which, when used in contact with molten glass, for example, tend to promote the formation of bubbles in the molten glass. Attempts have been made to overcome this fault by reheating the cooled cast shapes in an oxidizing atmosphere at a very high temperature, at least 1600° C. (2912° F.), to reoxidize the reduced elements, but this heating is very costly because of the temperature required and the long duration of heat treatment necessitated by the slowness of the solid phase reactions. Alternate procedures known to correct this fault, consistent with the process of melting by the electric furnace, are to inject an oxidizing gas through the liquid bath; increase the distance between electrodes; and/or raise the level of the bath. These procedures would considerably increase the cost of operation.

A third fault of these cast refractories is their exuding a vitreous phase when used, for example, at the temperature of glass making. The quantity of this glassy phase is relatively important because it is known to be necessary to include in the product composition alkalis and alkaline earths in quantities sufficient to limit the cracking of the shapes during their cooling.

By other means, attempts have been made to obtain refractories with apparent porosity and permeabilities of practically zero by sintering zirconia, silica and alumina. Such sintering requires extremely high temperatures. Further the enlargement of the crystals during sintering causes several different phenomena, particularly some cleavages which create a porosity which cannot be completely reduced by heating, at least without exceeding a temperature of 1600° C. (2912° F.) which prevents at present the development of these processes on a large industrial scale.

Some procedures have also been proposed in which the reaction of the oxides above are in a manner to cause the formation in the mass of a mullite phase in which the interstices are more or less filled with zirconia and corundum. But mullite is a composition frequently undesirable in refractories that are to be used in contact with glasses or basic slags. In effect, under the action of alkaline elements, it is transformed into nepheline ($Na_2O \cdot 2SiO_2 \cdot Al_2O_3$) and into kaliophilite $$(K_2O \cdot 2SiO_2 \cdot Al_2O_3)$$

with increase in volume, which causes the destruction of the refractories by shelling. The rate of corrosion in moltten glass is much higher for mullite than for zirconia or corundum.

The present invention has for its purpose obtaining a refractory product based on zirconia and alumina, with an apparent porosity of practically zero, with a permeability of practically zero, and of homogeneous structure free from cavities and reduced elements. In another way, these products are characterized by the ratio of zirconia to silica, which should be as high as possible in no case less than 2:1. It also involves a process for preparing such a product.

This procedure consists of sintering at a temperature of the order of 1550° C. (2822° F.) for a sufficient time, a mixture containing in suitable proportions of zirconia, of silica, and alumina, free or combined with a catalyzer capable of activating the surfaces of the compositions cited above, to prevent the formation of mullite, and to give to the silicious or glassy phase or both, a fluidity sufficient to cause it to migrate and fill the pore spaces formed in the initial molding operation.

The preferred materials are the mineral zircon which is zirconium silicate ($ZrO_2 \cdot SiO_2$), the mineral baddeleyite which is zirconium oxide ($ZrO_2$), which both can be used in the form of sand without any treatment or preliminary grinding, and corundum ($Al_2O_3$) in the form of fine powder. A preferred material is corundum resulting from the calcination of alumina obtained from the Bayer process. The industrial grains, which are agglomerates of alumina are reduced to unit crystals in a pulverizer. The proportion of zirconium silicate can be from 10 to 60% by weight of the total mass, the balance being corundum and/or zirconia. A certain proportion of the corundum or zirconia may be replaced by other compositions inert to glasses and slags such at $TiO_2$, $Cr_2O_3$, rare earth oxides, etc.

The function of the catalyzer is triple. It creates first, at the surface of the solid grains some active thin films which favor producing a material having an apparent density close to absolute density, with an apparent porosity and permeability of practically zero. Its second function is to prevent or to limit the formation of mullite by action of the alumina on the silicate or zirconium following the well known reaction:

$$2ZrO_2 \cdot SiO_2 + 3Al_2O_3 \rightarrow 3Al_2O_3 \cdot 2SiO_2 + 2ZrO_2$$

Its third function is to give the silicious matrix a fluidity such that the slight excess of the vitreous phase with respect to the quantity necessary to fill the pores between the alumina crystals and the zirconia is eliminated in the interior of the piece, at least in major part, during the course of burning by migration towards the exterior, and which permits the final removal from the surface by grinding. It should be noted that the refractory product thus obtained does not continue to exude the vitreous phase on further heating, even prolonged heating at the temperatures of molten glass. Catalyzers particularly suitable to fill this triple function include cryolite ($3NaF \cdot AlF_3$), chiolite ($5NaF \cdot 3AlF_3$) or their potassium homologues.

The proportion of catalyzer added is variable according to the proportion of residual mullite which can be tolerated. It would generally comprise between 0.5 and 3% by weight. However, in some cases values of 5% may be desirable. A catalyzer proportion between 2% and 3% permits in general obtaining zero mullite content.

The firing temperature at which the piece is maintained to obtain the highest density is on the order of 1550° C. (2822° F.). At higher temperatures, one would obtain products of zero porosity, zero permeability, and free of cavities, but one would diminish the qualities and physical characteristics because of the formation of bubbles in the vitreous phase. The optimum time to maintain the temperature of firing should be sufficient to obtain the maximum density. Depending on the volume and size of the piece, it should be from 2 to 24 hours.

Conforming to the invention, the firing should be in an oxidizing atmosphere to prevent formation of reduced elements in the finished product.

The respective proportions of the final crystalline phases can be regulated within certain limits by variations in the firing scheduled.

Forming the refractory pieces is done by molding the mixture of materials by the classical methods of the industry. Since it is usual in this industry in the purpose of facilitating the handling of pieces after drying, one can add to the mixture a smaller quantity of the order of 1 to 2% of an organic agglomerant (methylcellulose, bisulphite liquors, etc.).

For the fabrication of large pieces, it is preferable to include in the mixture a certain proportion of crushed prefired chamotte (grog) alumina-zircon material obtained itself under the conditions cited above. The granularmetric analysis and the proportion of such prefired material used in the mixture to be molded are adjusted for the desired shapes.

Our invention includes sintered refractory products which consist essentially of zirconia, alumina and a vitreous silica phase. The ratio of zirconia to silica is at least 2:1 and in some of these products zirconia is substantially 19.5%–27.0% by weight; the alumina is substantially 50.0%–56.5% by weight and the vitreous silica phase is substantially 23.0%–24.0% by weight.

Also included in the invention are sintered refractory products which consist essentially of zirconia, alumina, a vitreous silica phase and mullite. The ratio of zirconia to silica is at least 2:1. In some of these products, the zirconia is substantially 19.0%–40% by weight; the alumina is substantially 12.0%–56.5% by weight; the mullite is substantially 0%–20.0% by weight and the vitreous silica phase is substantially 14.5%–28.5% by weight. In some products the mullite is 0%–47% of theoretical amounts thereof.

The following examples will explain in detail the processes and results of the invention.

EXAMPLES 1 AND 2

These examples concern the fabrication of refractory products of 65% corundum and 35% zircon, of about 9″ x 4.5″ x 2.5″ in size (9″ straight).

The raw materials used have the following characteristics:

*Chemical Composition*

|  | Zircon Sand | Bayer Calcined Alumina |
|---|---|---|
| $SiO_2$ | 32.9 | 0.1 |
| $Al_2O_3$ | 0.1 | 99.5 |
| $ZrO_2$ | 66.5 |  |
| $TiO_2$ | 0.1 | Tr. |
| $Fe_2O_3$ | 0.2 | 0.1 |
| CaO | Tr. | 0.05 |
| MgO | Tr. | 0.05 |
| $Na_2O$ | 0.1 | 0.2 |
| $K_2O$ | 0.1 | Tr. |

*Granularmetric analysis*

|  | Zircon Sand | Bayer Calcine |
|---|---|---|
| Residue on screen 23 AFNOR | 27% | 17 AFNOR 5%. |
| 22 AFNOR | 60% |  |
| 21 AFNOR | 85% |  |
| 20 AFNOR | 97% |  |

NOTE:
17 AFNOR=Tyler screen No. 325.
20 AFNOR=Tyler screen No. 200.
21 AFNOR=Tyler screen No. 140.
22 AFNOR=Tyler screen No. 120.
23 AFNOR=Tyler screen No. 65.

The base composition of the mixture was as follows:

|  | Percent |
|---|---|
| Calcined Bayer alumina | 64 |
| Zircon sand | 35 |
| Methylcellulose | 1 |

The nature and quantity of Catalyzer added were respectively 1.5% cryolite for Example 1
3.0% cryolite for Example 2

The different constituents above were intimately mixed with 8% water in a pan mixer, then formed on a hydraulic press under a pressure of 200 kg./cm.² (2800 lbs./cu. in.) to obtain 9″ straights.

The pieces were dried, and then raised to 1550° C. (2822° F.) and held at this temperature for 15 hours. The firing shrinkage was 9%.

The brick had the following characteristics:

*Physical characteristics*

|  | Example 1 | Example 2 |
|---|---|---|
| Apparent density | 3.4 | 3.4. |
| Apparent porosity | 0 | 0. |
| Permeability | 0 | 0. |
| Temperature for a subsidence of 0.5% under a load of 2 kg./cm.² (method AFNOR). | >1,700° C. (3,092° F.). | >1,650° C. (3,002° F.). |
| Cold crushing strength | >4,000 kg./cm.² (67,000 p.s.i.). | >4,000 kg./cm.² (67,000 p.s.i.). |

*Mineralogical composition*

|  | Theoretical, percent | Actual (determined by X-rays) | |
|---|---|---|---|
|  |  | Example 1 | Example 2 |
| Zirconia | 23.4 | 19.0 | 19.5 |
| Corundum | 35.2 | 50.0 | 56.5 |
| Mullite | 41.4 | 16.5 | 0 |
| Vitreous Phase | 0 | 14.5 | 24.0 |

EXAMPLES 3 AND 4

These examples concern the fabrication of refractory products of 50% corundum and 50% zircon in blocks about 10″ x 8″ x 7″ in size.

The raw materials used were the same as in Examples 1 and 2.

The composition of the mixture was as follows:

|  | Percent |
|---|---|
| Grog-corundum-zircon previously obtained with 50% of corundum following the process of the invention, crushed to 3 mm. | 40 |
| Calcined Bayer alumina | 29.5 |
| Zircon sand | 29.5 |
| Methylcellulose | 1 |

The nature of the catalyst and its quantity for the total materials used, were respectively 1.5% cryolite in Example #3
3.0% cryolite in Example #4

The different constituents above were intimately mixed with 5% water in a pan mixer, formed on a hammer press with a falling weight of 600 kg. (1,320 lbs.) from a height of 25 cm. (10 inches). The pieces were dried, then raised to 1550° C. (2822° F.) and held at this temperature for 10 hours. The linear firing shrinkage was 5%.

The finished products had the following characteristics:

| | Example 3 | Example 4 |
|---|---|---|
| Apparent density | 3.4 | 3.3 |
| Apparent porosity | 0 | 0. |
| Permeability | 0 | 0. |
| Temperature for a subsidence of 0.5% under a load of 2 kg./cm.$^2$ (method AFNOR). | >1,700° C. (3,092° F.). | >1,650° C. (3,002° F.). |
| Cold crushing strength | >5,000 kg./cm.$^2$ (70,000 p.s.i.). | >5,000 kg./cm.$^2$ (70,000 p.s.i.). |

*Mineralogical composition*

| | Theoretical | Actual (determined by X-rays) | |
|---|---|---|---|
| | | Example 3 | Example 4 |
| Zirconia | 33.2 | 26.5 | 27.0 |
| Corundum | 8.3 | 32.0 | 50.0 |
| Mullite | 58.5 | 20.0 | 0 |
| Vitreous Phase | 0 | 21.5 | 23 |

Products made in accordance with Examples 3 and 4 were also characterized by extreme hardness. For example, in a comparable abrasion test with silicon carbide shapes there was a substantial loss of volume in the silicon carbide tile, while the loss of material from the above products was too small to be measured. In attempting to surface grind product shapes with a silicon carbide wheel, no substantial amount of material was removed.

EXAMPLE 5

This example concerns the fabrication of refractory products with partial substitution of corundum by zirconia.

Besides the raw materials described previously, zirconia of the following chemical composition was used in this example:

| | Percent |
|---|---|
| $ZrO_2$ | 98.5 |
| $SiO_2$ | 1.00 |
| $TiO_2$ | 0.1 |
| $Fe_2O_3$ | 0.1 |
| CaO | Tr. |
| MgO | Tr. |
| $Na_2O$ | 0.3 |

The composition of the total mixture was the following:

| | Percent |
|---|---|
| Corundum | 29.0 |
| Zirconia | 20.0 |
| Zircon sand | 48.5 |
| Cryolite | 1.5 |
| Methylcellulose | 1.0 |

The different constituents above were intimately mixed with 8% water in a pan mixer, then formed in a hydraulic press under a pressure of 200 kg./cm.$^2$ (2900 p.s.i.) to obtain a 9" straight brick. The pieces were dried, then fired to 1550° C. (2822° F.) for 6 hours. The linear firing shrinkage was 10%.

The characteristics of the finished brick were:

| | |
|---|---|
| Apparent density | 3.55. |
| Apparent porosity | 0. |
| Permeability | 0. |
| Temperature for a subsidence of 0.5% under a load of 2 kg./cm.$^2$ (method AFNOR) | 1630° C. (2966° F.). |
| Cold crushing strength | 5000 kg./cm.$^2$ (70000 p.s.i.). |

*Mineralogical composition*

| | Theoretical | Actual (determined by X-rays) |
|---|---|---|
| Zirconia | 52.8 | 40.0 |
| Corundum | 0 | 12.0 |
| Mullite | 41.7 | 19.5 |
| Cristobalite | 5.5 | 0 |
| Vitreous Phase | 0 | 28.5 |

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:
1. A process of making a sintered refractory product having a ratio of zirconia to silica of not less than 2:1, substantially zero apparent porosity, substantially zero permeability, a homogeneous structure and being substantially free from cavities and reduced elements, said process comprising sintering in an oxidizing atmosphere for substantially 2–24 hours a mixture, said mixture being substantially 10%–60% by weight zirconium silicate, being substantially 0.5%–5.0% by weight of a catalyst selected from the group consisting of cryolite, chiolite and their potassium homologues, the balance consisting essentially of and being selected from the group consisting of alumina, zirconia and a mixture of same, said catalyst effecting said substantially zero porosity and said substantially zero permeability and minimizing formation of mullite; said product being selected from the group consisting of a material consisting essentially of zirconia, alumina and a vitreous silica phase and of a material consisting essentially of zirconia, alumina, a vitreous silica phase and mullite.

2. The process of claim 1 wherein said catalyst is substantially 2.0%–3.0% by weight.

3. The process of claim 1 wherein said sintering is carried out at a temperature of about 1550° C.

4. A sintered refractory product consisting essentially of zirconia, alumina, a vitreous silica phase and mullite, the ratio of zirconia to silica being not less than 2:1; said zirconia being substantially 19.0% to 40% by weight, said alumina being substantially 12.0% to 56.5% by weight, said mullite being present in amounts up to 20.0% by weight, said vitreous silica phase being substantially 14.5% to 28.5% by weight, said product having substantially zero porosity, substantially zero permeability, a homogeneous structure and being substantially free from cavities and reduced elements.

5. The product of claim 4 wherein said mullite is present in amounts up to about 47% of theoretical amounts thereof.

6. A sintered refractory product consisting essentially of zirconia, alumina and a vitreous silica phase, the ratio of zirconia to silica being not less than 2:1; said zirconia being substantially 19.5% to 27.0% by weight, said alumina being substantially 50.0% to 56.5% by weight, said vitreous silica phase being substantially 23.0% to 24.0% by weight, said product having substantially zero apparent porosity, substantially zero permeability, a homogeneous structure and being substantially free from cavities and reduced elements.

7. The process of claim 1 wherein a portion of at least one of alumina and the zirconia is replaced by a member selected from the group consisting of $TiO_2$, $Cr_2O_3$ and an oxide of a rare earth metal.

References Cited by the Examiner

UNITED STATES PATENTS 2,842,447  7/1958  Schlotzhauer et al. ____ 106—57

TOBIAS E. LEVOW, *Primary Examiner.*

J. E. POER, *Assistant Examiner.*